US012667908B1

(12) United States Patent
Yin et al.

(10) Patent No.: US 12,667,908 B1
(45) Date of Patent: Jun. 30, 2026

(54) INSULATING CUSHION MATERIALS FOR ELECTROMAGNETIC PULSE WELDING AND METHODS FOR CONTROLLING DEFORMATION OF FLYER PLATES

(71) Applicant: CHONGQING UNIVERSITY OF SCIENCE AND TECHNOLOGY, Chongqing (CN)

(72) Inventors: Limeng Yin, Chongqing (CN); Wei Feng, Chongqing (CN); Yuhua Chen, Chongqing (CN); Long Zhang, Chongqing (CN); Shanlin Wang, Chongqing (CN); Liping Zhang, Chongqing (CN); Zilong Su, Chongqing (CN); Taiyong Zou, Chongqing (CN); Danni Song, Chongqing (CN)

(73) Assignee: CHONGQING UNIVERSITY OF SCIENCE AND TECHNOLOGY, Chongqing (CN)

( * ) Notice: Subject to any disclaimer, the term of this patent is extended or adjusted under 35 U.S.C. 154(b) by 0 days.

(21) Appl. No.: 19/420,696

(22) Filed: Dec. 15, 2025

(30) Foreign Application Priority Data

Oct. 9, 2025 (CN) .......................... 202511436629.5

(51) Int. Cl.
*B23K 20/26* (2006.01)
*B23K 20/06* (2006.01)

(52) U.S. Cl.
CPC .............. *B23K 20/26* (2013.01); *B23K 20/06* (2013.01)

(58) Field of Classification Search
CPC ........ B23K 20/26; B23K 20/06; B23K 37/04; B23K 37/0461; B23K 11/115; B23K 20/04; B23K 20/227; B23K 35/001; B32B 15/012; B32B 3/04; B32B 3/266; B32B 7/05; B32B 15/18; B32B 15/20; B32B 2250/03; B32B 2605/08; B32B 15/01; B32B 15/013;

(Continued)

(56) References Cited

U.S. PATENT DOCUMENTS

| 4,340,167 A * | 7/1982 | Packer ................... H05K 3/306 |
| | | 228/180.1 |
| 2007/0039933 A1* | 2/2007 | Cheng .................. B23K 26/356 |
| | | 219/121.69 |

FOREIGN PATENT DOCUMENTS

CN 116380277 A * 7/2023 ............. G01K 11/06

* cited by examiner

*Primary Examiner* — Ibrahime A Abraham
*Assistant Examiner* — Kristina B Burns
(74) *Attorney, Agent, or Firm* — Porus IP LLC

(57) ABSTRACT

Disclosed is an insulating cushion material for electromagnetic pulse welding a method for controlling deformation of a flyer plate in electromagnetic pulse welding using the insulating cushion material. The insulating cushion material includes rice grains or bean grains. The method includes: preparing a base plate and the flyer plate for welding, and cleaning and drying the base plate and the flyer plate; determining an overlap spacing and a collision gap based on specifications of the base plate and specifications of the flyer plate; selecting the insulating cushion material based on the collision gap; placing the insulating cushion material between the base plate and the flyer plate based on the overlap spacing; starting an electromagnetic pulse apparatus and performing electromagnetic pulse welding according to a set process parameter; cleaning broken particles of the insulating cushion material between the base plate and the flyer plate after completing the electromagnetic pulse welding.

12 Claims, 3 Drawing Sheets

(58) Field of Classification Search
CPC ... B32B 15/017; B32B 15/011; B32B 15/016;
B32B 15/018; B32B 37/02; B32B 37/10;
B32B 2037/1081; B32B 2250/40; B60Y
2304/00; B60Y 2410/124
See application file for complete search history.

400

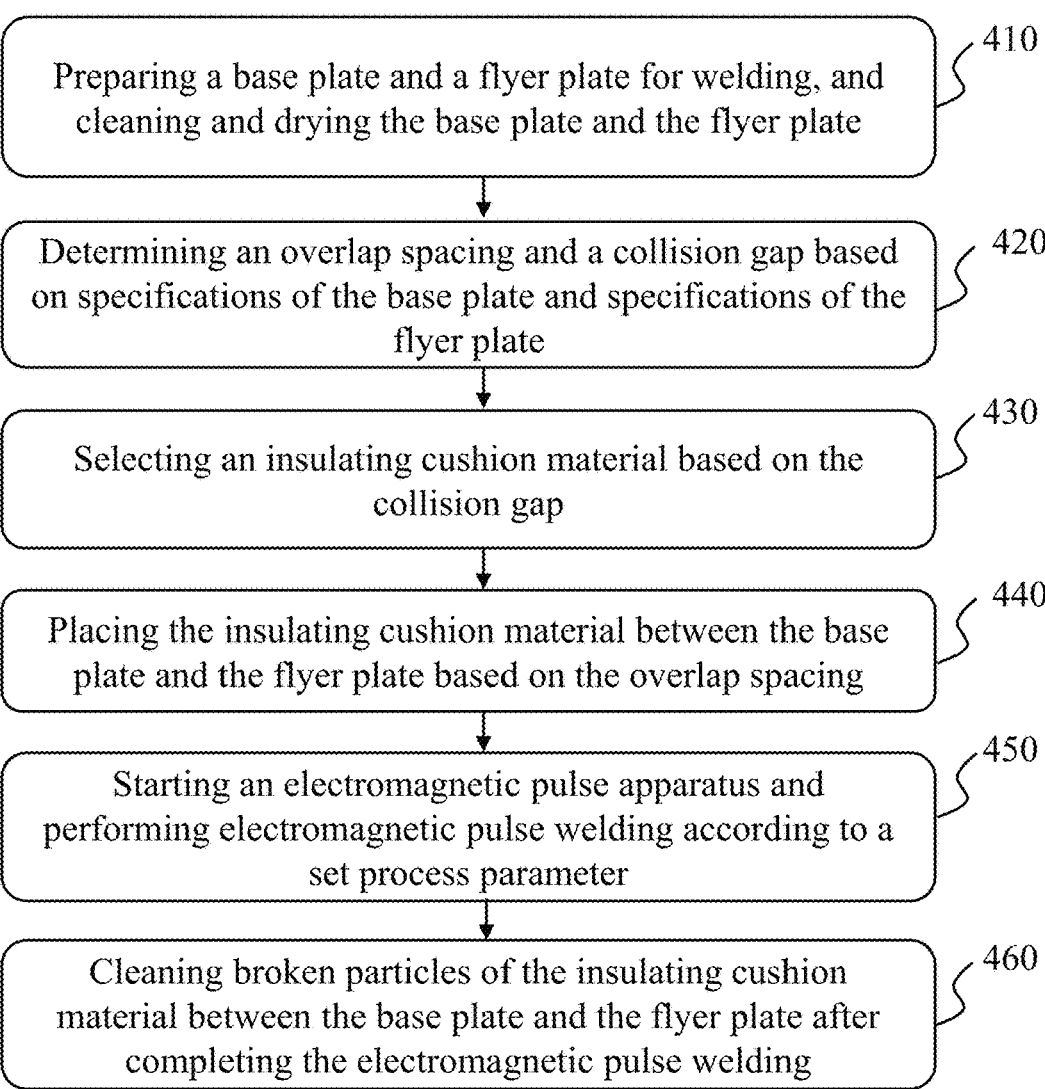

Preparing a base plate and a flyer plate for welding, and cleaning and drying the base plate and the flyer plate — 410

Determining an overlap spacing and a collision gap based on specifications of the base plate and specifications of the flyer plate — 420

Selecting an insulating cushion material based on the collision gap — 430

Placing the insulating cushion material between the base plate and the flyer plate based on the overlap spacing — 440

Starting an electromagnetic pulse apparatus and performing electromagnetic pulse welding according to a set process parameter — 450

Cleaning broken particles of the insulating cushion material between the base plate and the flyer plate after completing the electromagnetic pulse welding — 460

FIG. 4

INSULATING CUSHION MATERIALS FOR ELECTROMAGNETIC PULSE WELDING AND METHODS FOR CONTROLLING DEFORMATION OF FLYER PLATES

CROSS-REFERENCE TO RELATED APPLICATIONS

This application claims priority to the Chinese Patent Application No. 202511436629.5, filed on Oct. 9, 2025, the contents of which are hereby incorporated by reference.

TECHNICAL FIELD

The present disclosure generally relates to a field of electromagnetic pulse welding, and in particular to an insulating cushion material for electromagnetic pulse welding and a method for controlling deformation of a flyer plate.

BACKGROUND

Core components that determine collision energy during electromagnetic pulse welding mainly include: a high-voltage capacitor bank, an automatic control system, a high-velocity switching device, a forming coil, and an insulating cushion material. The insulating cushion material mainly functions to control a collision gap and a collision velocity, and prevent unintended leakage. The collision gap is a distance between a flyer plate and a base plate. The collision gap determines whether a velocity of the flyer plate after being acted upon by an electromagnetic force can reach an impact velocity required for welding. The collision gap must not be too large or too small. Therefore, selecting a suitable insulating cushion material is crucial for electromagnetic pulse welding.

Currently, insulating spacers used for electromagnetic pulse welding of plate components are primarily resin-based spacers. Exemplary types of available insulating spacers include angled spacers, curved spacers, and right-angled spacers. Although these existing insulating spacers can ensure welding stability and safety to a certain extent, they struggle to precisely control a deformation amount (a warping angle) at a non-welded portion at an end of the flyer plate. More critically, the insulating spacer cannot be removed smoothly and quickly after welding. Significant effort is usually required, often involving fixtures driven by a power source, to remove the insulating spacer. Additionally, processes such as pressing and heating are required to flatten the non-welded portion at the end of the flyer plate, which is very troublesome.

Therefore, it is desirable to provide an insulating cushion material for electromagnetic pulse welding and a method for controlling deformation of a flyer plate, which can precisely control the deformation amount and ensure that the insulating cushion material can be easily removed.

SUMMARY

One or more embodiments of the present disclosure provide an insulating cushion material for electromagnetic pulse welding. The insulating cushion material includes rice grains or bean grains.

In some embodiments, the insulating cushion material comprises rice grains having a diameter not greater than 3 mm, and the rice grains are arranged in a single layer. In some embodiments, a spacing between adjacent rice grains is 10-20 mm.

In some embodiments, a water content in the insulating cushion material is in a range of 14.5-15.5%.

One or more embodiments of the present disclosure provide a method for controlling deformation of a flyer plate in electromagnetic pulse welding using the insulating cushion material provided in one or more embodiments of the present disclosure. The method comprising: preparing a base plate and the flyer plate for welding, and cleaning and drying the base plate and the flyer plate; determining an overlap spacing and a collision gap based on specifications of the base plate and the flyer plate; selecting the insulating cushion material based on the collision gap; placing the insulating cushion material between the base plate and the flyer plate based on the overlap spacing; starting an electromagnetic pulse apparatus and performing electromagnetic pulse welding according to a set process parameter; cleaning broken particles of the insulating cushion material between the base plate and the flyer plate after completing the electromagnetic pulse welding.

BRIEF DESCRIPTION OF THE DRAWINGS

The present disclosure is further described by way of exemplary embodiments. These exemplary embodiments are described in detail with reference to the accompanying drawings. These embodiments are non-limiting. In these embodiments, the same reference numerals denote the same structures, wherein:

FIG. 4 is a flowchart illustrating an exemplary process of a method for controlling deformation of a flyer plate according to some embodiments of the present disclosure.

DETAILED DESCRIPTION

Figure 1:
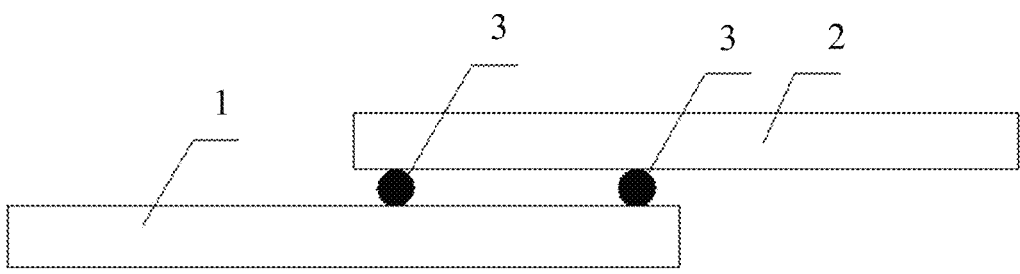
FIG. 1 is a schematic cross-sectional view illustrating an insulating cushion material disposed between a base plate and a flyer plate according to some embodiments of the present disclosure.

To make the technical solutions, advantages, and objectives of the present disclosure clearer, the technical solutions of the embodiments of the present disclosure will be described clearly and completely below. The described embodiments are part of the embodiments of the present disclosure, not all embodiments. Based on the described embodiments of the present disclosure, all other embodiments obtained by a person of ordinary skill in the art without creative efforts shall fall within the protection scope of the present disclosure.

Unless otherwise defined, technical or scientific terms used in the present disclosure shall have the ordinary meaning understood by a person with general skill in the field to which the present disclosure belongs.

Some embodiments of the present disclosure provide an insulating cushion material for electromagnetic pulse welding. The insulating cushion material includes rice grains or bean grains.

In some embodiments, the insulating cushion material is configured to prevent electrical contact during the welding process and control a collision gap between a flyer plate and a base plate.

In some embodiments, the rice grains are spherical or ellipsoidal. In some embodiments, the bean grains may be soybean grains.

In some embodiments of the present disclosure, by employing rice grains or bean grains, the insulating cushion material can be instantly impacted into fine powder during welding, allowing for one-time removal using compressed gas without the need for tooling heating or mechanical cleaning. This approach significantly reduces flyer plate warping and post-processing costs, achieving green, efficient, and low-deformation electromagnetic pulse welding.

In some embodiments, the insulating cushion material comprises rice grains having a diameter not greater than 3 mm, and the rice grains are arranged in a single layer.

It should be understood that if the diameter of the rice grains is greater than 3 mm, the spacing between the rice grains may not be precisely controlled. Local support provided by the rice grains to the flyer plate may be too high, which may cause uneven deformation of the flyer plate or uneven distribution of welding energy, thereby affecting joint quality. Furthermore, if the rice grains are arranged in a plurality of layers, the grains may stack, and slippage may easily occur between the grains, which may cause structural instability before welding and uncontrollable welding quality.

In some embodiments of the present disclosure, the insulating cushion material comprises rice grains having a diameter not greater than 3 mm, and the rice grains are arranged in a single layer. This ensures precise collision gap and uniform support while allowing the rice grains to be easily crushed into fine powder upon impact and completely removed in one blow with compressed gas, thereby achieving low weld warping and no residue.

In some embodiments, the insulating cushion material includes rice grains with a diameter of 1 mm, 2 mm, or 3 mm.

In some embodiments, the insulating cushion material includes a plurality of rice grains or a plurality of soybean grains. The plurality of rice grains or the plurality of soybean grains are arranged in a single layer between the base plate and the flyer plate.

In some embodiments, a spacing between adjacent rice grains is 10-20 mm.

In some embodiments, the rice grains are arranged in a matrix between the base plate and the flyer plate, wherein the spacing may be an inter-row spacing between each row of the matrix and an inter-column spacing between each column of the matrix. That is to say, the inter-row spacing between each row of the matrix is 10-20 mm, and the inter-column spacing between each column of the matrix is 10-20 mm.

In some embodiments, the spacing between adjacent rice grains may be one selected from the ranges of 10-12 mm, 12-14 mm, 14-16 mm, 16-18 mm, and 18-20 mm. In some embodiments, the spacing between the adjacent rice grains may be one or more selected from 10 mm, 12 mm, 14 mm, 16 mm, 18 mm, and 20 mm.

In some embodiments of the present disclosure, setting the spacing between adjacent rice grains to 10-20 mm can ensure the flyer plate receives uniform support points throughout the welding process, avoiding local collapse, while simultaneously minimizing the amount of grains used. This results in less total debris after welding, faster cleanup, and reduced surface indentation and warping of the flyer plate caused by densely packed support points.

In some embodiments, a water content in the insulating cushion material is in a range of 14.5-15.5%.

In some embodiments, the water content in the insulating cushion material may be one selected from the ranges of 14.5-14.7%, 14.7-14.9%, 14.9-15.1%, 15.1-15.3%, or 15.3-15.5%. In some embodiments, the water content in the insulating cushion material may be one or more selected from 14.5%, 14.7%, 14.9%, 15.1%, 15.3%, and 15.5%.

In some embodiments of the present disclosure, setting the water content in the insulating cushion material to 14.5-15.5% enables the grains to maintain sufficient toughness and compressive strength to resist premature breakage during filling and the welding impact, while also allowing them to uniformly disintegrate into fine powder upon impact. This facilitates one-time removal by compressed gas, thereby stabilizing the collision gap, reducing flyer plate warping, and eliminating subsequent cleaning.

In some embodiments, the insulating cushion material (e.g., the rice grains) is arranged in a single layer between the base plate and the flyer plate.

The base plate refers to a fixed plate placed on a workbench of an electromagnetic pulse apparatus.

In some embodiments, the base plate is a rectangular plate, and the specifications of the base plate may be pre-cut by technical personnel. For example, the base plate may be a rectangular plate with a wall thickness of 3 mm, a length of 140 mm, and a width of 100 mm. Here, the wall thickness, the length, and the width are all specifications of the base plate.

In some embodiments, a material of the base plate includes aluminum alloy, stainless steel, etc. Merely by way of example, the material of the base plate is 6061 aluminum alloy.

The electromagnetic pulse apparatus includes an electromagnetic pulse welding apparatus. The electromagnetic pulse welding apparatus refers to an apparatus for welding the base plate and the flyer plate.

The flyer plate refers to a movable plate placed above the base plate, maintaining a gap between itself and the base plate.

In some embodiments, the flyer plate is a plate having the same shape as the base plate, and specifications of the flyer plate are pre-cut by technical personnel based on the specifications of the base plate.

In some embodiments, a material of the flyer plate includes aluminum alloy, stainless steel, etc. Merely by way of example, the material of the flyer plate is the same as the material of the base plate.

In some embodiments, the flyer plate is suspended in the electromagnetic pulse apparatus via a fixture. Under the action of an electromagnetic pulse, the flyer plate may instantaneously detach from the fixture and move at high velocity towards the base plate, thereby achieving welding.

In some embodiments, the gap between the flyer plate and the base plate is used for placing the insulating cushion material, ensuring tight contact between the base plate, the insulating cushion material, and the flyer plate. The gap between the flyer plate and the base plate may be preset by technical personnel.

FIG. 1 is a schematic cross-sectional view illustrating an insulating cushion material disposed between a base plate and a flyer plate according to some embodiments of the present disclosure.

In some embodiments, as shown in FIG. 1, an insulating cushion material 3 is arranged between a base plate 1 and a flyer plate 2.

In some embodiments, the base plate and the flyer plate partially overlap. The term "partially overlap" refers to that when viewed from above, a projection of the base plate overlaps with a projection of the flyer plate in a horizontal plane. Merely by way of example, as shown in FIG. 1, the flyer plate is placed above the base plate. The projection of the base plate and the projection of the flyer plate partially overlap along a central axis direction between the base plate and the flyer plate. Technical personnel may pre-set an overlap length. The overlap length refers to a linear dimension of an overlapping portion between the base plate and the flyer plate.

Figure 2:
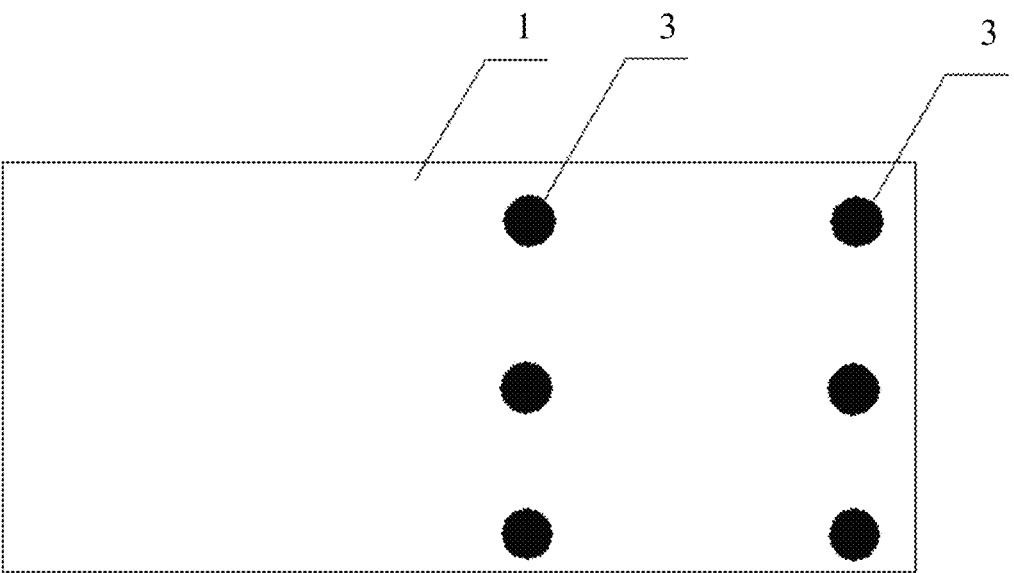
FIG. 2 is a schematic diagram illustrating a laying state of an insulating cushion material according to some embodiments of the present disclosure.

FIG. 2 is a schematic diagram illustrating a laying state of the insulating cushion material according to some embodiments of the present disclosure.

In some embodiments, as shown in FIG. 2, if the insulating cushion material includes rice grains or bean grains, the rice grains or the bean grains are arranged in a matrix between the base plate and the flyer plate. Each row of the matrix is arranged according to a row spacing. Each column of the matrix is arranged according to a column spacing.

FIG. 4 is a flowchart illustrating a process of a method for controlling deformation of a flyer plate according to some embodiments of the present disclosure.

In some embodiments, as shown in FIG. 4, process 400 may be executed by a processor. The process 400 may include steps 410-460.

In some embodiments, the processor may include a central processing unit (CPU), an application-specific integrated circuit (ASIC), an application-specific instruction set processor (ASIP), a physics processing unit (PPU), a digital signal processor (DSP), a processor, a microprocessor unit, a reduced instruction set computer (RISC), a microprocessor, etc., or any combination thereof. In some embodiments, the processor may be local or remote. In some embodiments, the processor may be implemented on a cloud platform. Merely by way of example, the cloud platform may include a private cloud, a public cloud, a hybrid cloud, a community cloud, a distributed cloud, an internal cloud, a multi-layer cloud, etc., or any combination thereof.

In 410, preparing a base plate and the flyer plate for welding, and cleaning and drying the base plate and the flyer plate.

It should be understood that cleaning and subsequently drying the base plate and flyer plate removes oil films and moisture from their surfaces. This prevents the pulse energy from being dissipated by oil films, moisture, dust, etc., during the electromagnetic pulse, thereby improving energy utilization efficiency. Simultaneously, drying prevents any water film from instantaneously vaporizing under the electromagnetic pulse impact, which may lift the flyer plate and cause curling of the welded portion or the formation of holes.

In 420, determining an overlap spacing and a collision gap based on the specifications of the base plate and the specifications of the flyer plate.

In some embodiments, the overlap spacing may be a horizontal distance from an edge of a vertical projection of the flyer plate on a surface of the base plate to the opposite edge of the base plate. For example, if both the flyer plate and the base plate are rectangular plates, and their ends are the short sides of these rectangular plates, the flyer plate is vertically projected onto the base plate. The left edge of this projection corresponds to the left end of the flyer plate, and the right edge of the base plate corresponds to the right end of the flyer plate. The horizontal distance from the left end of the flyer plate (as defined by the projection) to the right end of the base plate is the length of the projection, which is also the overlap spacing between the base plate and the flyer plate.

The collision gap refers to a distance between the base plate and the flyer plate in a direction perpendicular to central axes of the base plate and the flyer plate.

In some embodiments, the processor may determine the overlap spacing and the collision gap by querying a first preset table based on the specifications of the base plate and the specifications of the flyer plate. The first preset table may include a relationship between the specifications of the base plate and the flyer plate, and the overlap spacing and the collision gap. In some embodiments, the first preset table may be preset by the processor based on historical data.

In 430, selecting an insulating cushion material based on the collision gap.

In some embodiments, the processor may select the insulating cushion material by querying a second preset table based on the collision gap. The second preset table may include a relationship between the collision gap and the insulating cushion material. In some embodiments, the second preset table may be preset by the processor based on historical data.

In some embodiments, technical personnel or the processor may further select the insulating cushion material based on a wall thickness of the flyer plate. The wall thickness of the flyer plate refers to a thickness of the flyer plate in a vertical direction. In some embodiments, technical personnel may measure the wall thickness of the flyer plate using a ruler tool (e.g., a vernier caliper, etc.). The present disclosure does not limit the manner for obtaining the wall thickness of the flyer plate.

In some embodiments, in response to the wall thickness of the flyer plate being not greater than 2 mm, the insulating cushion material is spherical or ellipsoidal rice grains with a diameter of 0.5-1 mm.

In some embodiments, in response to the wall thickness of the flyer plate being greater than 2 mm but not greater than 5 mm, the insulating cushion material is spherical or ellipsoidal rice grains with a diameter of 1.5-2 mm.

In some embodiments, in response to the wall thickness of the flyer plate being greater than 5 mm, the insulating cushion material is spherical or ellipsoidal rice grains with a diameter in a range of 2-3 mm, or the insulating cushion material is soybean grains with a diameter of 4.5 mm.

It should be understood that technical personnel may first determine a general type of insulating cushion material based on the collision gap (e.g., selecting rice grains with a diameter of 0.5-3 mm as the insulating cushion material based on the collision gap), and then further determine a type of grain or the grain diameter for the insulating cushion material according to actual conditions based on the wall thickness of the flyer plate.

In some embodiments of the present disclosure, determining the specific grain diameter and type based on the flyer plate wall thickness allows for precise matching between the toughness of grains within the same diameter range and the impact energy. This approach prevents fine grains used for excessively thick plates from being crushed prematurely and avoids local indentations caused by large grains used for thin plates. It significantly reduces the count of trial welding cycles and enables a rapid process preparation characterized by "single-selection grain, ready-to-use" matching.

In 440, placing the insulating cushion material between the base plate and the flyer plate based on the overlap spacing.

In some embodiments, the technical personnel or the processor may determine a grain spacing between grains of the insulating cushion material based on the overlap spacing, and place the insulating cushion material between the base plate and the flyer plate based on the grain spacing. The grain spacing refers to a spacing between the grains of the insulating cushion material. For example, the grain spacing may be a spacing between rice grains.

For example, the processor may determine the grain spacing between the rice grains of the insulating cushion material by querying a third preset table based on the overlap spacing, and place the rice grains between the base plate and the flyer plate based on the grain spacing between the rice grains. The third preset table may include a relationship between the overlap spacing and the grain spacing. In some embodiments, the third preset table may be preset by the processor based on historical data.

In 450, starting an electromagnetic pulse apparatus and performing electromagnetic pulse welding according to a set process parameter.

The set process parameter refers to one or more parameters used for performing the electromagnetic pulse welding. For example, the set process parameter may include voltage, capacitance, energy level, trigger timing, etc.

In some embodiments, the set process parameter may be preset by the technical personnel based on experience.

In some embodiments, the technical personnel may perform the electromagnetic pulse welding on the base plate and the flyer plate according to the set process parameter.

In 460, cleaning the broken particles of the insulating cushion material between the base plate and the flyer plate after completing the electromagnetic pulse welding.

The broken particles of the insulating cushion material refer to the crushed insulating cushion material after the electromagnetic pulse welding.

Figure 3:
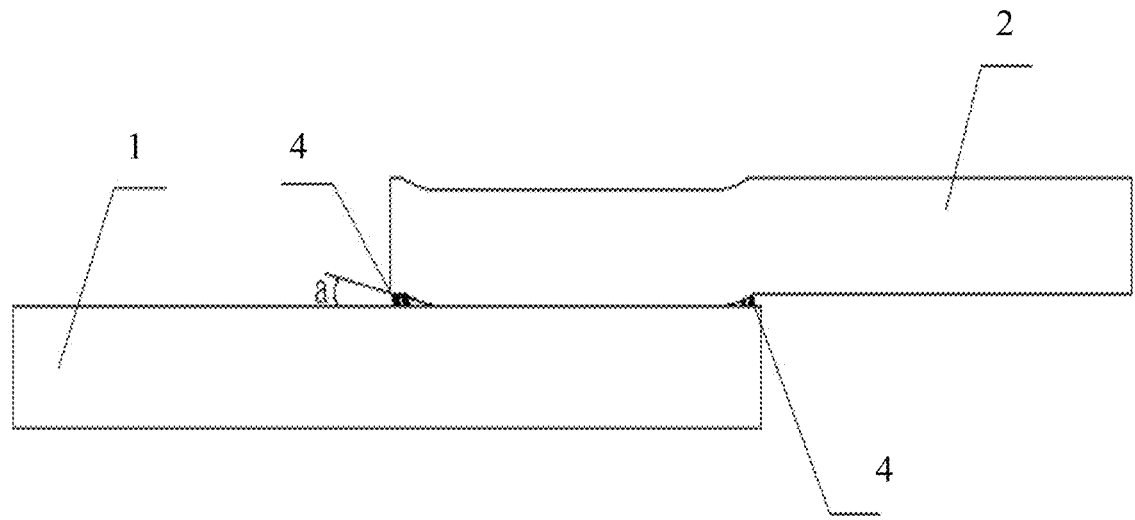
FIG. 3 is a schematic diagram illustrating a state of broken particles of an insulating cushion material after electromagnetic pulse welding according to some embodiments of the present disclosure.

FIG. 3 is a schematic diagram illustrating a state of broken particles of an insulating cushion material after electromagnetic pulse welding according to some embodiments of the present disclosure.

In some embodiments, as shown in FIG. 3, after completing the electromagnetic pulse welding, broken particles 4 of the insulating cushion material may be distributed around a welded location of the base plate 1 and the flyer plate 2.

In some embodiments, technical personnel may use compressed gas to blow away the broken particles of the insulating cushion material between the base plate and the flyer plate. The compressed gas may be compressed air.

In some embodiments of the present disclosure, after the base plate and flyer plate are cleaned and dried. The overlap spacing and collision gap are then determined according to the specifications of the base plate and flyer plate. Subsequently, the insulating cushion material is selected and placed between the base plate and the flyer plate based on the overlap spacing, followed by the execution of electromagnetic pulse welding. Upon completion of the electromagnetic pulse welding, the broken particles of the insulating cushion material are cleaned away. This process controls the warping angle of the flyer plate to a minimal degree, eliminates the need for flattening after welding, and allows the insulating cushion material to be cleaned away effortlessly with a single blast of air, thereby achieving electromagnetic pulse lap welding with low deformation, high efficiency, and no post-processing.

Further detailed description is provided below through specific examples. It should be noted that the water content of the granular material in the examples is expressed as a range value. This is because rice grains from the same batch, after drying, exhibit variations in particle size. Since grains are randomly selected from the same batch for use, employing a range value for characterization is more appropriate.

Example 1

An exemplary process for controlling deformation of a flyer plate in electromagnetic pulse welding comprises the following steps:

In step 1, preparing a base plate 1 and a flyer plate 2 for welding, and performing cleaning and drying on the base plate 1 and the flyer plate 2 for later use. The base plate 1 and the flyer plate 2 in this example are both made of 6061 aluminum alloy. Each of base plate 1 and the flyer plate 2 has a wall thickness of 3 mm, a length of 140 mm, and a width of 100 mm. The welding manner between base plate 1 and the flyer plate 2 is lap welding with an overlap length of 35 mm.

In step 2, determining an overlap spacing and a collision gap based on specifications of the base plate 1 and the flyer plate 2, where the collision gap is 2 mm.

In step 3, selecting an insulating cushion material 3 having a size matching the collision gap. The insulating cushion material 3 is spherical or ellipsoidal rice grains with a diameter of 2±0.2 mm. Rice grains of this size are pre-obtained from Wuchang glutinous rice and dried, and a water content of the rice grains are controlled to 14.5-15.5%

In step 4, placing the base plate 1 on a welding workbench of an electromagnetic pulse apparatus, and placing the insulating cushion material 3 between the base plate 1 and the flyer plate 2 according to the obtained overlap spacing, where a spacing between adjacent rice grains is 15±2 mm. The state at this time is shown in FIG. 1 and FIG. 2.

In step 5, starting the electromagnetic pulse apparatus, and performing electromagnetic pulse welding according to a set process parameter (e.g., a fixed input energy of 40 kJ).

In step 6, after welding is completed, cleaning broken particles 4 of the insulating cushion material between the base plate 1 and the flyer plate 2. In this process, the spherical or ellipsoidal rice grains are formed into broken rice particles (i.e., the broken particles 4 of the insulating cushion material) under the impact of the flyer plate 2. The state at this time is shown in FIG. 3.

Example 2

An exemplary process for controlling deformation of a flyer plate in electromagnetic pulse welding comprises the following steps:

In step 1, preparing a base plate 1 and a flyer plate 2 for welding, and performing cleaning and drying on the base plate 1 and the flyer plate 2 for later use. The base plate 1 and the flyer plate 2 in this example are both made of 6061 aluminum alloy. Each of the base plate 1 and the flyer plate 2 has a wall thickness of 6 mm, a length of 140 mm, and a width of 100 mm. The welding manner between base plate 1 and the flyer plate 2 is lap welding with an overlap length of 35 mm.

In step 2, determining an overlap spacing and a collision gap based on specifications of the base plate 1 and the flyer plate 2, where the collision gap is 3 mm.

In step 3, selecting an insulating cushion material 3 with a size matching the collision gap. The insulating cushion material 3 is spherical or ellipsoidal rice grains with a diameter of 3±0.1 mm. Rice grains of this size are pre-obtained by screening pearl rice and subsequently dried, with their water content controlled to 14.5-15.5%.

In step 4, placing the base plate 1 on a welding workbench of an electromagnetic pulse apparatus, and placing the insulating cushion material 3 between the base plate 1 and the flyer plate 2 according to the determined overlap spacing, where a spacing between adjacent rice grains is 13±2 mm. The state at this time is shown in FIG. 1 and FIG. 2.

In step 5, starting the electromagnetic pulse apparatus, and performing electromagnetic pulse welding according to a set process parameter (e.g., a fixed input energy of 60 kJ).

In step 6, after welding is completed, cleaning broken particles 4 of the insulating cushion material between the base plate 1 and the flyer plate 2. In this process, the spherical or ellipsoidal rice grains are formed into rice particles (i.e., the broken particles 4 of the insulating cushion material) under the impact of the flyer plate 2. The state at this time is shown in FIG. 3.

Example 3

An exemplary process for controlling deformation of a flyer plate in electromagnetic pulse welding comprises the following steps:

In step 1, preparing a base plate 1 and a flyer plate 2 for welding, and performing cleaning and drying on the base plate 1 and the flyer plate 2 for later use. The base plate 1 and the flyer plate 2 in this example are both made of 6061 aluminum alloy. Each of the base plate 1 and the flyer plate 2 has a wall thickness of 1.5 mm, a length of 140 mm, and a width of 100 mm, and the welding manner is lap welding with an overlap length of 35 mm.

In step 2, determining an overlap spacing and a collision gap based on specifications of the base plate 1 and the flyer plate 2, where the collision gap is 1 mm.

In step 3, selecting an insulating cushion material 3 with a size matching the collision gap. The insulating cushion material 3 is spherical or ellipsoidal rice grains with a diameter of 1±0.1 mm. Rice grains of this size are pre-obtained by polishing (to reduce the size of rice grains for easier attainment of a target size), screening pearl rice, and subsequently drying them, with their water content controlled to 14.5-15.5%.

In step 4, placing the base plate 1 on a welding workbench of an electromagnetic pulse apparatus, and placing the insulating cushion material 3 between the base plate 1 and the flyer plate 2 according to the determined overlap spacing, where a spacing between adjacent rice grains is 12±2 mm. The state at this time is shown in FIG. 1 and FIG. 2.

In step 5, starting the electromagnetic pulse apparatus, and performing electromagnetic pulse welding according to a set process parameter (e.g., a fixed input energy of 35 kJ).

In step 6, after welding is completed, cleaning broken particles 4 of the insulating cushion material between the base plate 1 and the flyer plate 2. In this process, the spherical or ellipsoidal rice grains are formed into rice particles (i.e., the broken particles 4 of the insulating cushion material) under the impact of the flyer plate 2. The state at this time is shown in FIG. 3.

Example 4

An exemplary process for controlling deformation of a flyer plate in electromagnetic pulse welding comprises the following steps:

In step 1, preparing a base plate 1 and a flyer plate 2 for welding, and performing cleaning and drying on the base plate 1 and the flyer plate 2 for later use. The base plate 1 and the flyer plate 2 in this example are both made of 6061 aluminum alloy, each having a wall thickness of 8 mm, a length of 150 mm, and a width of 900 mm. The welding manner between the base plate 1 and the flyer plate 2 is lap welding with an overlap length of 40 mm.

In step 2, determining an overlap spacing and a collision gap based on specifications of the base plate 1 and the flyer plate 2, where the collision gap is 4.5 mm.

In step 3, selecting an insulating cushion material 3 with a size matching the collision gap. The insulating cushion material 3 is soybean grains with a diameter of 4.5±0.1 mm. Soybean grains of this size are pre-obtained by screening soybean grains and subsequently drying them, with their water content controlled to 14.5-15.5%.

In step 4, placing the base plate 1 on a welding workbench of an electromagnetic pulse apparatus, and placing the insulating cushion material 3 between the base plate 1 and the flyer plate 2 according to the determined overlap spacing, where a spacing between adjacent soybean grains is 17±2 mm. The state at this time is shown in FIG. 1 and FIG. 2.

In step 5, starting the electromagnetic pulse apparatus, and performing electromagnetic pulse welding according to a set process parameter (e.g., a fixed input energy of 70 kJ).

In step 6, after welding is completed, cleaning broken particles 4 of the insulating cushion material between the base plate 1 and the flyer plate 2. In this process, the soybean grains are formed into soybean particles (i.e., the broken particles 4 of the insulating cushion material) under the impact of the flyer plate 2. The state at this time is shown in FIG. 3.

Comparative Example 1: The difference from Example 1 lies in using an epoxy resin plate with a length of 100 mm, a width of 5 mm, and a wall thickness of 2 mm as the insulating cushion material.

Comparative Example 2: The difference from Example 1 lies in using an epoxy resin plate with a length of 100 mm, a width of 5 mm, and a wall thickness of 3 mm as the insulating cushion material.

Comparative Example 3: The difference from Example 1 lies in using an epoxy resin plate with a length of 100 mm, a width of 5 mm, and a wall thickness of 1 mm as the insulating cushion material.

Comparative Example 4: The difference from Example 1 lies in using an epoxy resin plate with a length of 100 mm, a width of 5 mm, and a wall thickness of 4.5 mm as the insulating cushion material.

The samples obtained from welding in the examples were tested, with the following results: In Example 1, an deformation amount (e.g., a warping angle $\alpha$) at a non-welded portion at an end of the flyer plate was 6°. In Example 2, the deformation amount (e.g., the warping angle $\alpha$) at the non-welded portion at the end of the flyer plate was 7.5°. In Example 3, the deformation amount (e.g., the warping angle $\alpha$) at the non-welded portion at the end of the flyer plate was 6.3°. In Example 4, the deformation amount (e.g., the warping angle $\alpha$) at the non-welded portion at the end of the flyer plate was 6.8°. Furthermore, the weld seams of the samples obtained in each example all met the mechanical performance requirements. In Comparative Example 1, the deformation amount (e.g., the warping angle $\alpha$) at the non-welded portion at the end of the flyer plate was 21.5°. In Comparative Example 2, the deformation amount (e.g., the warping angle $\alpha$) at the non-welded portion at the end of the flyer plate was 19.7°. In Comparative Example 3, the deformation amount (e.g., the warping angle $\alpha$) at the non-welded portion at the end of the flyer plate was 16.1°. In Comparative Example 4, the deformation amount (e.g., the warping angle $\alpha$) at the non-welded portion at the end of the flyer plate was 24.9°. It can be seen that the solutions in the examples of the present disclosure can precisely control the deformation amount at the non-welded portion at the end of the flyer plate. The resulting deformation amount (the warping angle $\alpha$) at the non-welded portion at the end of the flyer plate is very small, and no flattening treatment is required for the non-welded portion at the end of the flyer plate after welding.

As the insulating cushion material provided in the present disclosure comprises rice grains or bean grains, the insulating cushion material between the base plate and the flyer plate is formed into broken particles after electromagnetic pulse welding. Subsequently, only compressed gas is needed to blow away the broken particles of the insulating cushion material. This approach achieves smooth and quick removal of the insulating cushion material after welding, eliminating the need for fixtures used to remove insulating spacers in traditional schemes, which is very convenient.

Comparative Example 5: The difference from Example 1 lies in that the water content of the rice grains is controlled to 13-14%. In this comparative example, the rice grains may break even after placement and before welding is performed. Once the rice grains break prematurely, it becomes impossible to meet the required set collision gap.

Comparative Example 6: The difference from Example 1 lies in that the water content of the rice grains is controlled to 16-17%. In this comparative example, the broken rice particles formed under the impact of the flyer plate (2) are uneven in size and include relatively large particles. The deformation amount (e.g., the warping angle $\alpha$) at the non-welded portion at the end of the plate in the resulting sample was 15.4°.

The basic concepts have been described above. Obviously, to a person skilled in the art, the foregoing detailed disclosure is merely illustrative and not limiting to the present disclosure. Although not expressly stated herein, a person skilled in the art may make various modifications, improvements, and amendments to the present disclosure. Such modifications, improvements, and amendments are suggested in the present disclosure, so they still fall within the spirit and scope of the exemplary embodiments of the present disclosure.

Meanwhile, the present disclosure uses specific words to describe the embodiments of the present disclosure. For example, "one embodiment", "an embodiment", and/or "some embodiments" mean a certain feature, structure, or characteristic related to at least one embodiment of the present disclosure. Therefore, it should be emphasized and noted that "an embodiment" or "one embodiment" or "an alternative embodiment" mentioned twice or more at different positions in the present disclosure does not necessarily refer to the same embodiment. In addition, certain features, structures, or characteristics in one or more embodiments of the present disclosure may be appropriately combined.

In addition, unless explicitly stated in the claims, the order of processing elements and sequences, the use of numbers and letters, or the use of other names in the present disclosure is not used to limit the order of the processes and manners of the present disclosure. While the present disclosure discusses some embodiments of the invention considered useful by way of various examples, it should be understood that such details are for illustrative purposes only, and the appended claims are not limited to the disclosed embodiments. Instead, the claims are intended to cover all modifications and equivalent combinations that conform to the substance and scope of the embodiments of the present disclosure. For example, although the implementation of various components described above may be embodied in a hardware device, it may also be implemented as a software only solution, e.g., an installation on an existing server or mobile device.

Similarly, it should be noted that, in order to simplify the expression disclosed in the present disclosure and thereby facilitate understanding of one or more embodiments of the invention, various features are sometimes grouped into a single embodiment, drawing, or description thereof in the foregoing description of the embodiments of the present disclosure. However, this manner of disclosure does not mean that the object of the present disclosure requires more features than those mentioned in the claims. Rather, claimed subject matter may lie in less than all features of a single foregoing disclosed embodiment.

In some embodiments, numbers describing the composition and the count of attributes are used. It should be understood that such numbers used to describe the embodiments are modified by the modifiers "about," "approximately," or "substantially" in some examples. Unless otherwise stated, "about," "approximately," or "substantially" indicates that the number allows a variation of ±20%. Accordingly, in some embodiments, the numerical parameters used in the specification and claims are approximations, which may vary depending on the desired characteristics of individual embodiments. In some embodiments, numerical parameters should consider the specified count of significant digits and adopt the manner of general digit retention. Although the numerical ranges and parameters used to confirm the breadth of their scope in some embodiments of the present disclosure are approximations, such numerical values are set as precisely as possible within the feasible range in specific embodiments.

Each patent, patent application, patent application publication, and other material, such as articles, books, specifications, publications, documents, etc., cited in the present disclosure is hereby incorporated by reference in its entirety. This excludes application history documents that are inconsistent with or conflict with the content of the present disclosure, and also excludes documents that limit the broadest scope of the claims of the present disclosure (whether currently or subsequently appended to the present disclosure). It should be noted that if the description, definition, and/or use of terms in the ancillary materials of the present disclosure are inconsistent with or conflict with the description, definition, and/or use of terms in the present disclosure, the description, definition, and/or use of terms in the present disclosure shall prevail.

Finally, it should be noted that the above embodiments are only used to illustrate the technical solutions of the present disclosure rather than limit them. Although the present disclosure has been described in detail with reference to the preferred embodiments, those of ordinary skill in the art should understand that they may still modify the technical solutions of the present disclosure or make equivalent replacements. These modifications or equivalent replacements cannot make the modified technical solutions depart from the spirit and scope of the technical solutions of the present disclosure.

What is claimed is:

1. A method for controlling deformation of a flyer plate in electromagnetic pulse welding using an insulating cushion material comprising rice grains or bean grains, comprising: preparing a base plate and the flyer plate for welding, and cleaning and drying the base plate and the flyer plate; determining an overlap spacing and a collision gap based on specifications of the base plate and specifications of the flyer plate; selecting the insulating cushion material based on the collision gap; placing the insulating cushion material between the base plate and the flyer plate based on the overlap spacing; starting an electromagnetic pulse apparatus and performing electromagnetic pulse welding according to a set process parameter; and cleaning broken particles of the insulating cushion material between the base plate and the flyer plate after completing the electromagnetic pulse welding.

2. The method of claim 1, wherein the cleaning broken particles of the insulating cushion material between the base plate and the flyer plate after completing the electromagnetic pulse welding includes: blowing away the broken particles of the insulating cushion material between the base plate and the flyer plate using compressed gas.

3. The method of claim 2, wherein, in response to a wall thickness of the flyer plate being not greater than 2 mm, the insulating cushion material is spherical or ellipsoidal rice grains with a diameter of 0.5-1 mm.

4. The method of claim 2, wherein, in response to a wall thickness of the flyer plate being greater than 2 mm but not greater than 5 mm, the insulating cushion material is spherical or ellipsoidal rice grains with a diameter of 1.5-2 mm.

5. The method of claim 2, wherein, in response to a wall thickness of the flyer plate being greater than 5 mm, the insulating cushion material is spherical or ellipsoidal rice grains with a diameter in a range of 2-3 mm, or the insulating cushion material is soybean grains.

6. The method of claim 3, wherein a water content in the insulating cushion material is in a range of 14.5-15.5%.

7. The method of claim 3, wherein a spacing between adjacent rice grains is in a range of 10-20 mm.

8. The method of claim 3, wherein the spherical or ellipsoidal rice grains are arranged in a single layer between the base plate and the flyer plate.

9. The method of claim 3, wherein the spherical or ellipsoidal rice grains are arranged in a matrix between the base plate and the flyer plate.

10. The method of claim 1, wherein the flyer plate is a plate having a same shape as the base plate.

11. The method of claim 1, wherein a material of the flyer plate is the same as a material of the base plate.

12. The method of claim 1, wherein the base plate and the flyer plate partially overlap.

* * * * *